(No Model.)
C. W. COLLINS.
HITCHING DEVICE.
No. 495,961. Patented Apr. 25, 1893.
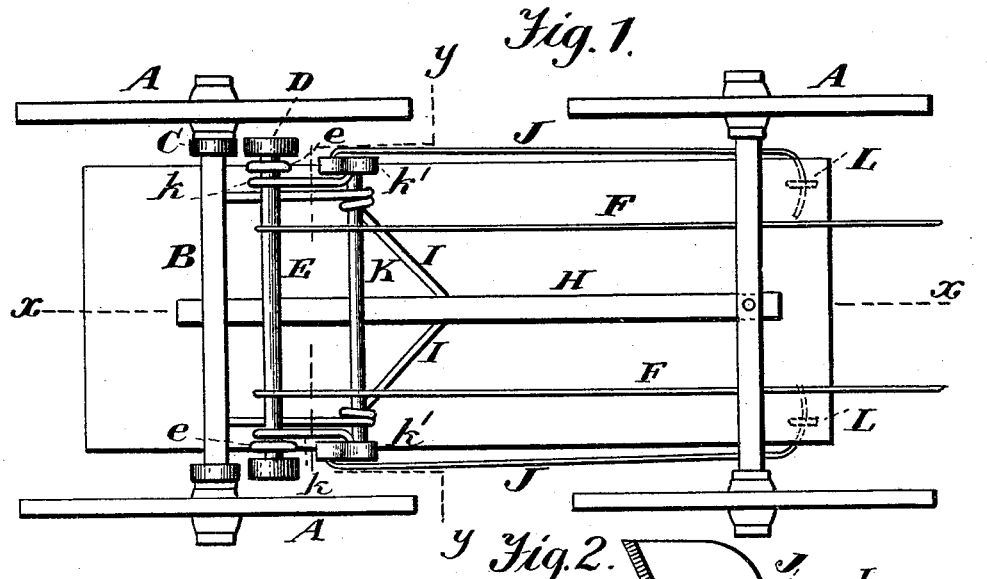
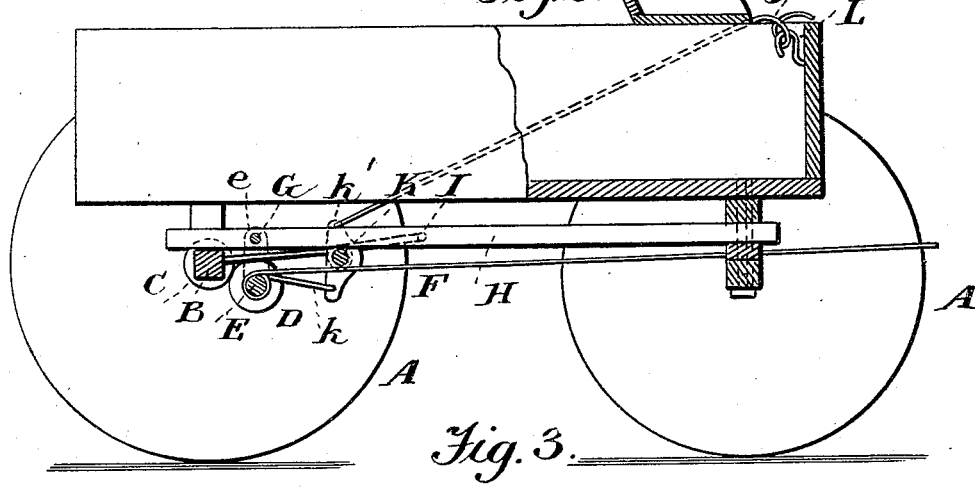
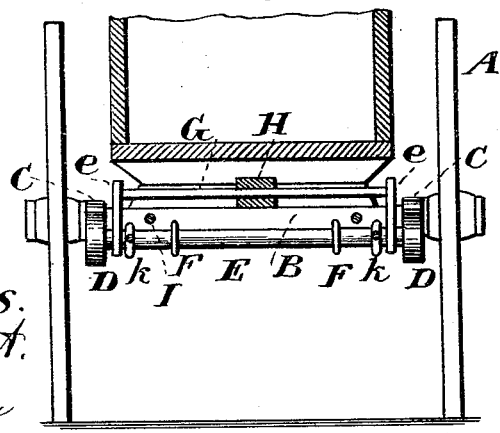
Witnesses.
A. Ruppert.
G. M. Copenhaver
Inventor.
Charles W. Collins
Per
Thomas P. Simpson
atty

UNITED STATES PATENT OFFICE.

CHARLES W. COLLINS, OF GRANITE, MONTANA.

HITCHING DEVICE.

SPECIFICATION forming part of Letters Patent No. 495,961, dated April 25, 1893.

Application filed February 25, 1893. Serial No. 463,688. (No model.)

*To all whom it may concern:*

Be it known that I, CHARLES W. COLLINS, a citizen of the United States, residing at Granite, in the county of Deer Lodge and State of Montana, have invented certain new and useful Improvements in Devices for Preventing Horses from Running Away with Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to contrive some device by which horses may be held back and prevented from running away when they are left standing without being hitched; also when they have started to run on the road.

Figure 1 is a bottom plan view of a vehicle provided with my attachment; Fig. 2 a longitudinal vertical section on line $x$ $x$ of Fig. 1, and Fig. 3 a transverse vertical section on the dotted line $y$ $y$ of Fig. 1, showing the hooks to which the drawcords are looped.

In the drawings, A A represent wheels which turn on an axle B, the latter being provided on the inside of hub with a circular boss or friction wheel C.

D D are two friction wheels which are rotated by the bosses or wheels C C and caused to carry the windlass or shaft E so as to wind up the lines F F connecting with the bridle of a horse or horses. The lines F are fastened at one end to the windlass E so that the horses cannot run without winding up the lines and being pulled up quickly.

The windlass E is suspended pivotally on a rod or bar G supported in the reach H, and is connected by arms $e$ $e$ with the outer end of an arm $k$ on each end of a shaft K supported in bearings I I from the reach H.

$k'$ $k'$ are opposite arms to which are attached, at their ends, the cords J J, the free ends of said cords being brought within easy reach of the occupant of the vehicle so that he can easily draw the pulleys or friction wheels D D into contact with those on the hubs—and then put a loop on the end of said cords over a hook L in the vehicle. By looping the cords on these hooks, when the horses are left standing, they will be restrained from starting and, in a little while, will never attempt it.

Having thus described all that is necessary to a full understanding of my invention, what I claim as new, and desire to protect by Letters Patent, is—

The combination with a vehicle, of the wheels A A having friction wheels C C thereon, the shaft E rotated by friction wheels D D, provided with bridle lines F F, and having the arms $e$ $e$ and the shaft K having arms $k$ $k$ connected with arms $e$ $e$ and arms $k'$ $k'$ provided with the cords J J looped at the end, the shaft or windlass E being suspended pivotally on a rod or bar G supported on the reach, as and for the purpose set forth.

In testimony whereof I affix my signature in presence of two witnesses.

CHARLES W. COLLINS.

Witnesses:
 HECTOR MCDONALD,
 RODERICK MCISAAC.